United States Patent [19]

Doat

[11] 3,986,346
[45] Oct. 19, 1976

[54] PREPARATION OF CONCENTRATED EXTRACTS, FOR INSTANCE OF COFFEE

[76] Inventor: Jean Doat, 4, Cote du Pavillon, 78250 Meulan, France

[22] Filed: Apr. 16, 1975

[21] Appl. No.: 568,651

[52] U.S. Cl. ................................. 62/123; 426/384
[51] Int. Cl.² ..................... B01D 9/04; C02B 1/12
[58] Field of Search .......... 62/58 R, 123, 124, 58 C; 426/384

[56] References Cited
UNITED STATES PATENTS

| | | | |
|---|---|---|---|
| 2,676,469 | 4/1954 | Wenzelberger | 62/123 |
| 2,685,783 | 8/1954 | Benscheidt et al. | 62/58 C |
| 2,937,507 | 5/1960 | Toulmin, Jr. | 62/123 |
| 3,049,889 | 8/1962 | Carfagno | 62/123 |
| 3,102,036 | 8/1963 | Smith | 426/384 |
| 3,283,522 | 11/1966 | Ganiaris | 62/58 |

FOREIGN PATENTS OR APPLICATIONS

| | | | |
|---|---|---|---|
| 855,060 | 5/1940 | France | 62/123 |
| 1,167,882 | 12/1958 | France | 62/123 |
| 519,301 | 4/1972 | Switzerland | 62/123 |

*Primary Examiner*—William E. Wayner
*Assistant Examiner*—Ronald C. Capossela
*Attorney, Agent, or Firm*—Haseltine, Lake & Waters

[57] ABSTRACT

The preparation comprises the steps of freezing the water of an infusion into ice flakes or crystals, draining the resulting sherbet, injecting it under low pressure into a centrifuge, centrifuge draining it and forcing it out of the 'fuge under increased pressure. During each step, the liquid is collected. Finally, the liquid is thermally concentrated into a powder.

7 Claims, 2 Drawing Figures

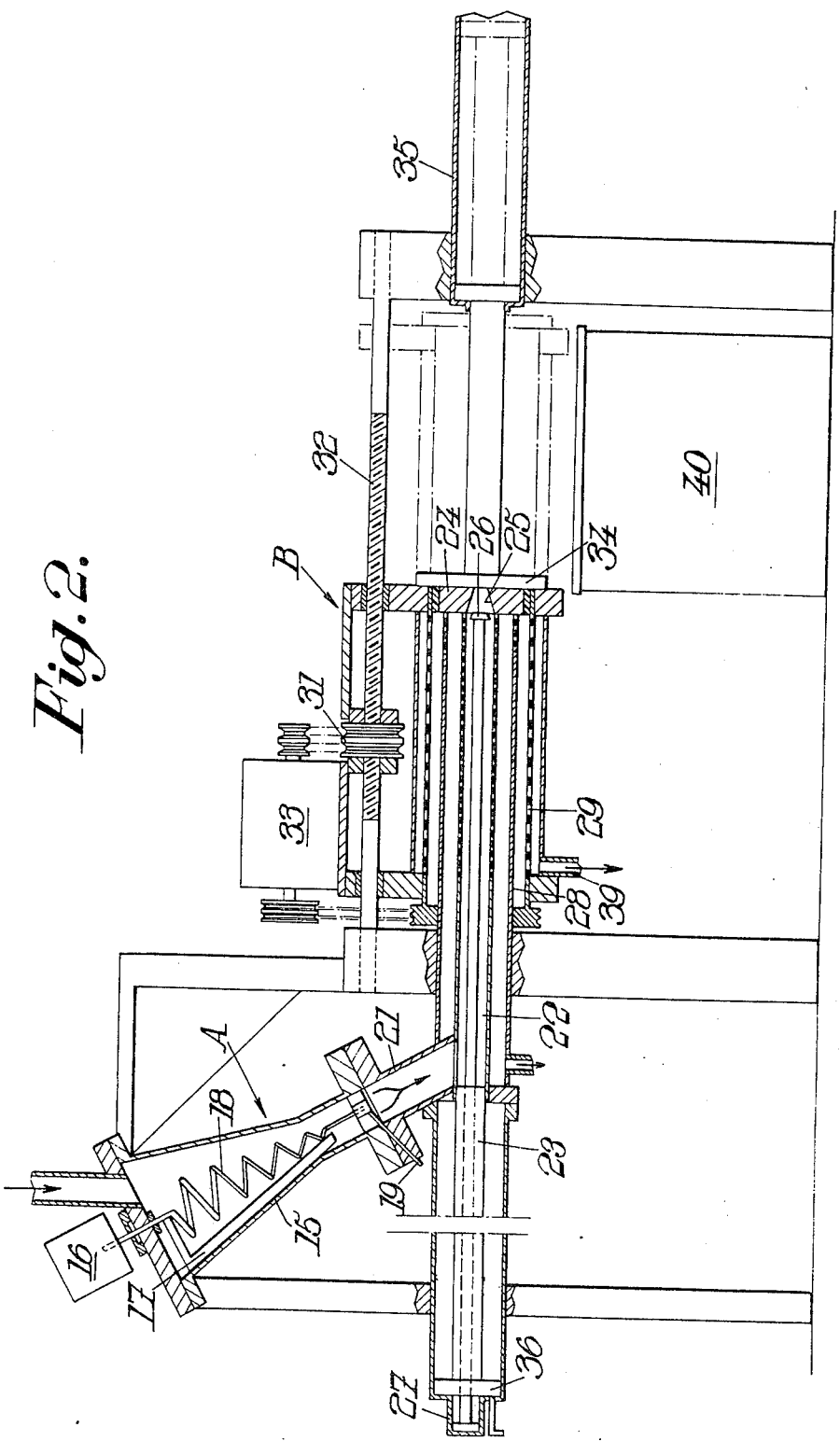

PREPARATION OF CONCENTRATED EXTRACTS, FOR INSTANCE OF COFFEE

BACKGROUND OF THE DISCLOSURE

The present invention relates to the preparation of concentrated extracts by dehydration of aqueous food or pharmaceutical products, notably — although not exclusively — concentrated extracts of materials of vegetal origin, such as fruit juices and infusions of seeds, of leaves or of flower tops, for example infusions of tea and especially of coffee.

Processes for the preparation of concentrated extracts of tea and coffee in powder or granular form are already known. However, they are not entirely satisfactory: they are complex and/or subject the product to drastic physical or chemical actions which degrade it and cause a loss of aroma which it is later necessary to compensate by addition of supplementary constituents.

It is an object of the present invention to provide an improved method and device which overcome the above-mentioned drawbacks.

SUMMARY OF THE INVENTION

A method for the preparation of concentrated extracts comprises cooling the product to a temperature such that the water alone is frozen. The freezing step is followed by one or more of the following successive steps: draining of the ice-containing mixture, injection under low pressure of the ice-containing mixture into a centrifuge, thin layer centrifugation of the ice-containing mixture, pressing the ice-containing mixture under high pressure (higher than the injection pressure). During each operation, the liquid flowing from the mixture is collected. Finally, the liquid collected is concentrated thermally.

The number and nature of steps will depend on the nature of the alimentary starting product. In the case of coffee, all of the operations enumerated above are generally used. On the other hand, it will be possible to use a simpler sequence in the case of fruit juices and certain alcoholic drinks.

The operations are typically carried out in a non-oxidizing atmosphere. Final concentration will generally be effected under partial vacuum with collection of the vapors and return of the latter to the aqueous product to avoid losses of aroma and of fragrance. The non-oxidizing atmosphere can be nitrogen, carbon dioxide or an inert gas.

The final thermal concentration operation will in most cases be pursued until an extract in the form of powder or flakes is obtained. The heating will advantageously be carried out by developing heat in the body of material, for example using high-frequency dielectric losses or micro-waves. Since micro-waves heating is expensive, it could be used as a terminal phase, the pre-drying being effected by high-frequency heating.

The favourable results obtained by the method according to the invention may probably be at least partially attributed to the fact that, from the beginning of the sequence of steps, water is frozen as crystals which trap a small fraction only of the constituents of the extract to be obtained (essences and dry products) and to the fact that the crystals are preserved intact up to an advanced stage of the separation. Extraction of the constituents from the extract, without degrading the latter is consequently easier. The ice collected is moreover advantageously recycled to the step of preparation of the aqueous starting product so as to recover most of the aromas or fragrances that it still contains. Yield can thus be quite satisfactory.

A processing device comprises a freezer for forming, from the aqueous product, a sherbet in which the water is in the crystalline stage; means for separating the sherbet into ice and into products to be preserved in the extract, comprising quasi-static draining means, means for injection at low pressure into a thin layer centrifuge, and/or means for extraction under high pressure, as well as means for liquid collection; and thermal concentration means for the collected liquid.

SHORT DESCRIPTION OF THE DRAWINGS

The invention will be better understood on the reading of the following description of an installation which constitutes thereof a particular embodiment given by way of non-limiting example. In the accompanying drawings:

FIG. 2 is a simplified sectional view, showing a portion of the installation at a larger scale.

DESCRIPTION OF A PREFERRED EMBODIMENT

Figure 1:
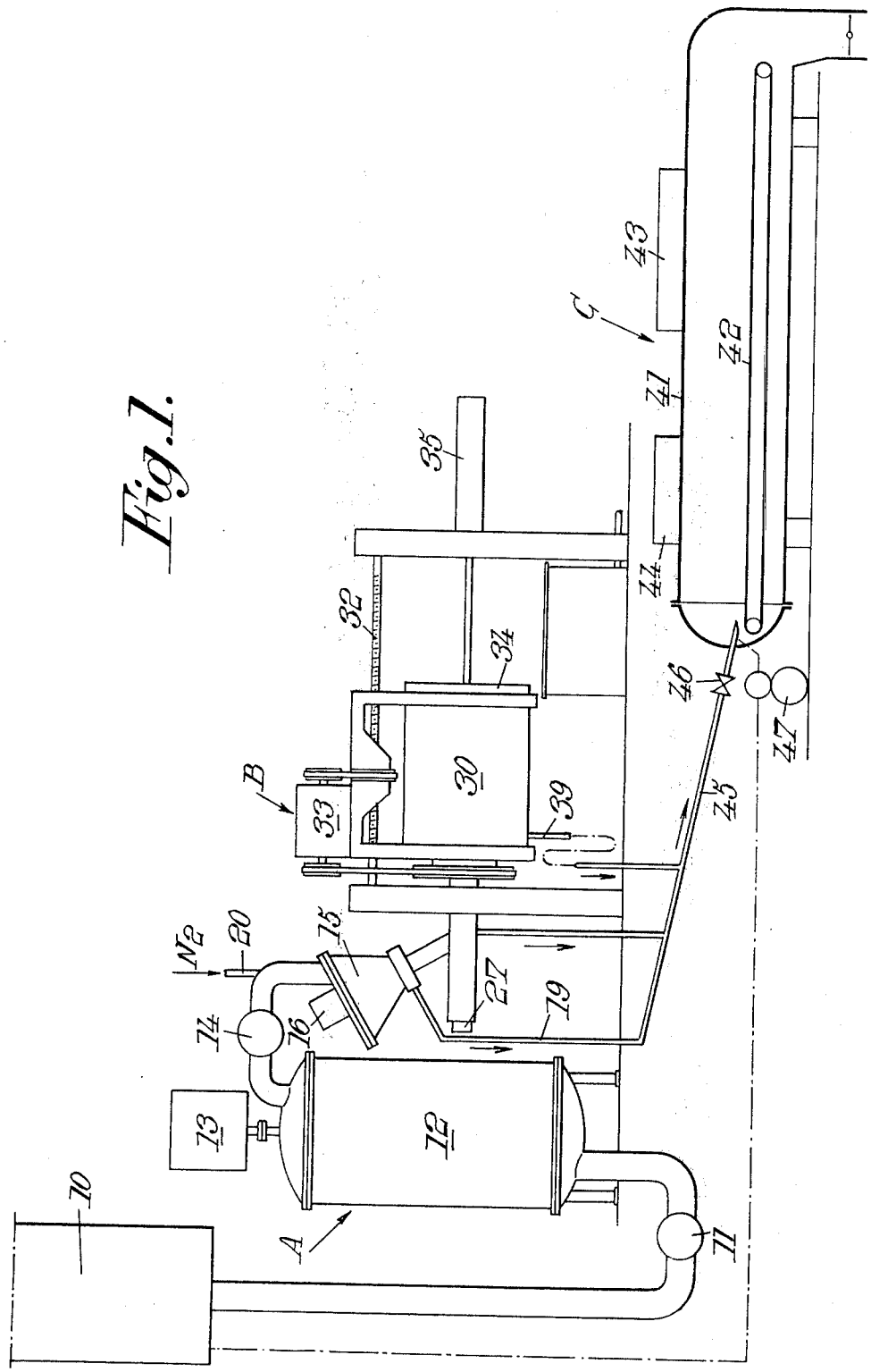
FIG. 1 is a diagrammatic front view showing the whole of the installation.

Referring to FIGS. 1 and 2, there is shown an apparatus for processing an infusion of coffee which may be prepared by any known method, but should be given as high as possible a concentration of solid materials and essences. The aqueous product is stored in a tank provided with a pump 11 for transferring it into the processing device. The device may be regarded as comprising, in succession, several subassemblies: a freezer A, a separating device B for fractionating the sherbet supplied by the freezer into ice and into products to be concentrated, and a drying device C. These subassemblies will now be successively described.

Freezer A consists of a vertical cylindrical tank 12 into which the infusion is sent by a pump 11. The tank is provided with cooling means, such as a coil or double jacket, and with temperature regulating means for cooling a batch of infusion stored into the freezer to a temperature and at a speed selected so that the water from the starting infusion passes into the state of crystals whilst imprisoning as small an amount as possible of the solid materials and essences. These values are selected according to the nature of the product, it being however understood that the final temperature will be less than 0° C and not under − 10° C.

Freezer A includes a stirrer (not shown), driven by a motor 13, which mixes the product during freezing and scrapes the wall to detach crystals therefrom, so as to form a sherbet in which the crystals or flakes of ice retain as little as possible of the essences and of the solid materials.

A control valve 11 is provided for adjusting the rate at which the installation is supplied.

The sherbet is driven from the freezer A under very low pressure into the separating device B by the pump 14.

The separating device shown in FIGS. 1 and 2 comprises a first stage where the sherbet is drained practically without dynamic stress, i.e. in static condition. This stage consists of a double-walled cone 15 (only one wall being shown in FIG. 2 for greater simplicity). The inner wall is formed with holes of some tenths of millimeter (generally less than 0.3 mm) to allow the essences and the solid materials of small size to escape into the intermediate annular space where they are collected in the form of a turbid liquid. An electric motor 16 rotates a scraper 17 which slides on the inner wall and a helix 18 which forces the sherbet toward the small diameter end of the cone. This helix may be tubular and formed with holes of small size for collection of turbid liquid in the helix. That liquid is collected in a pipe 19 connected to the helix via a rotary seal. To avoid degradation of the essence by oxidation and to prevent the crystals and flakes to agglomerate, a low pressure inert atmosphere is maintained in the device. For example, a pipe 20 may be provided to feed inert gas (nitrogen for example) into the cone 15. A drawing-off pipe can also be provided for the gas to sweep the device B.

A chute 21 connects the outlet of the draining cone 15 to a cylinder 22 where injection under low pressure occurs. A plunger 23 is mounted in the cylinder for movement between a rear position (in which it is illstrated in FIG. 2) for which it opens the outlet of the chute 21 into the cylinder 22 and a front position for which its right hand end is close to an injection head 24. A frustoconic passage 25 is formed in head 24 and is arranged to be closed by a valve member 26 actuated by a short stroke jack 27. The cylinder 22 is formed with holes of small size which allow the liquid products and powders to escape in the form of a turbid liquid or slurry. It is surrounded by a collecting jacket 28, connected to the injection head 24 and whose left hand end portion is formed with one or several extract outlet openings.

A centrifuge arranged for receiving the sherbet delivered by the injection head comprises a body 30 and, in the body, a drum 29 which rotates on the injection head 24 and the jacket 28. Body 30 is slidably mounted on rods parallel to the axis of the cylinder 22 and is provided with a mechanism adapted to move it longitudinally. In the embodiment shown, the mechanism comprises a nut 31 which is rotatably not slidably connected with body 30 and screwed onto a fixed threaded rod 32. A motor 33 is adapted to rotate drum 29. That motor or an additional motor is arranged to rotate the nut 31 through a speed reduction gear (and if necessary a reverser) and consequently to move the body 30 (and the drum 29 retained by the body) in the longitudinal direction.

A plate 34, actuated by a fluid jack 35 is arranged to close the right hand end opening of the centrifuge (as indicated in FIG. 2) when fluid pressure is applied to the right hand chamber of the jack 35.

The device B operates as follows: in initial condition the plunger 23 is withdrawn, as illustrated in FIG. 2; the valve 26 is open, the centrifuge is in its extreme lefthand position and is closed by the plate 34. The cylinder is being loaded from the cone A with sherbet which flows under gravity and due to the action of the rotating helix 18. An actuating hydraulic pressure is applied to the piston 36 of the plunger 23 for moving it forward. From the start of its advance, the piston closes the opening of the chute 21, avoiding any back flow toward the cone 15. Since the centrifuge is in its left hand position and is closed by the plate 34, the sherbet is placed under slight compression and there is a flow of solid products of fine size and of essences through the orifices of the cylinder 22. The turbid liquid flows through the openings of the jacket 28 and then the small diameter holes of drum 29 of the centrifuge and is collected in the body 30 and taken off through a flexible connector 39. The plunger may be replaced by another low pressre injection member, such as an endless screw.

The motor 33 is then energized and rotates the drum of the centrifuge 29; at the same time, the body of the centrifuge is moved toward the right. The speed of advance of the drum is synchronized with that of the plunger 23 by a conventional regulation system (not shown). The speed of rotation of the drum is selected so as not to damage the ice crystals. Progressively with the movement to the right of the centrifuge and of the plate 34 drawn by the centrifuge, the sherbet (whence an additional fraction of the essences flows) passes through the passage 25 and the gap between the injection head 24 and the plate 34 into the centrifuge and is distributed along the centrifuge as a thin layer (some millimeters).

When the centrifuge arrives at the right hand end of its stroke (position indicated in dash-dot lines on FIG. 2), at the same time, the jack 27 closes the valve 26 and the plunger 23 withdraws to the left to permit the introduction of the following batch, then the longitudinal movement of the centrifuge is reversed. The centrifuge hence returns to the left, followed by the plate 34 pushed by the jack 35. During that movement, the injection head 24, provided with an elastic lining at its periphery, scrapes the drum 29 and detaches the ice crystals which fall into the space comprised between the head 24, the drum 29 and the plate 34. During that step, the crystals are subjected to a pressure high enough to agglomerate them into pieces of ice, and to expel the balance of retained liquid. That liquid flows and draws most of the remaining powdered material.

When the centrifuge has thus travelled over the major part of its return stroke (three quarters for example) the jack 35 is rapidly brought backwards (to the right in FIG. 2). The plate 34 retracts and opens the centrifuge. During the balance of the return stroke of the centrifuge, injection head 24 ejects the ice which falls into a recovery tank 40. This ice may be used to prepare another infusion batch in order to recover the essences or dry products that it can still contain.

The sherbet is thus successively subjected to static drainage in the cone 15, then to low pressure injection (typically about 500 g/cm$^2$), then to centrifugation, and finally to high pressure (4 kg/cm$^2$ for example). Thus, by an action which is more and more vigorous as the process is carried out, the essences and the solid products are progressively separated from the ice which can be kept in the state of crystals and of flakes until the separation process is quite advanced, in practice until the final high pressure liquid removal. Since the centrifugation is effected progressively and with the material as a thin and regular layer, its efficiency is high. The installation remains nonetheless very simple. Finally, the frigorific power applied is lower than in the case of those prior methods which required deep freezing of the starting infusion followed by a crushing step.

The device C for providing dried materials starting from the liquid can be conventional and may comprise a tunnel 41 kept under partial vacuum and in which a conveyor such as a moving carpet 42 circulates a thin layer of the sludge in front of heating means. The device C may use two different successive heating means (FIG. 1), acting successively on the product. Final heating is by a micro-wave generator 43, which provides a substantially uniform heat production in the body of material, but has the drawback of high cost.

The pre-heating means, for expelling the major part of the moisture, is of a different type, for example a high-frequency dielectric loss oven 44.

The liquid is steadily brought to the tunnel through a pipe 45, if necessary provided with a regulating device valve 46. The slurry contained in the pipe 45 forms a "slug" which retains the vacuum developed in the tunnel by a pump 47. The latter is advantageously provided with means trapping the aromas before they are returned to the tank 10.

An installation of the above-defined type, possibly simplified, can also be used for preparing dry extracts of fruit juices, notably citrus fruit juices and, more generally, juices which include essences and dry products together with a high proportion of water.

The invention is not limited to the method and to the device, nor to the horizontal arrangement which have been given by way of examples and extends to all equivalents.

I claim:

1. An apparatus for the preparation of concentrated extracts of aqueous food products and the like, comprising:
    a freezer tank,
    means for producing in said freezer tank a sherbet of ice crystals and products to be retained from said aqueous products,
    centrifuge means for separating part of said products to be retained from said sherbet;
    conveying means exerting a low pressure on the sherbet formed in said freezer tank for passing it into said centrifuge and distributing it as a thin layer in said centrifuge,
    extracting means for extracting the centrifuged sherbet from said centrifuge under a higher pressure and expelling an additional fraction of said products to be retained from the sherbet,
    conduit means associated with said conveying means, centrifuge means and extracting means for collecting the products separated from the sherbet,
    and thermal concentration means connected to said conduit means for receiving said products to be retained and subjecting them to final dehydration to form said concentrated extracts.

2. Apparatus according to claim 1, wherein said conveying means comprises draining means and low pressure injection means,
    said draining means having a cone shaped container having an inlet and an outlet, said container being formed with a perforated inner wall and an imperforate outer wall, helical means mounted for rotation within said container about the axis of said cone, means for rotating said helical means and circulating sherbet from said inlet to said outlet without subjecting said sherbet to appreciable pressure, and means for collecting the liquid flowing through said perforated inner wall, and
    said injection means comprising a stationary cylinder having a front perforated portion and a rear imperforate portion formed with an inlet connected to the outlet of said draining means, and movable means for closing said inlet and forcing the sherbet from said cylinder into said centrifuge through said injection head.

3. An apparatus according to claim 1, wherein said centrifugal separation means comprises a stationary cylinder having an imperforate rear portion connected to said conveying means for receiving sherbet therefrom, and a perforated front portion provided with a terminal injection head connected to said front portion, said injection head being formed with a central injection opening, a drum located coaxially with and around said cylinder and supported by said injection head for rotation and axial movement thereof, motor means for rotating said centrifuge drum, motor means for axially moving said centrifuge drum along said cylinder for successive portions of said drum to confront said injection head during said axial movement, and valve means for closing the injection opening in said injection head.

4. Apparatus according to claim 3, wherein said injection head has an overall diameter such that said head scrapes the internal wall of the centrifuge drum and said centrifuge is provided with a closure plate located adjacent the injection head and provided with a jack which, when actuated, forces said plate against the centrifuge.

5. Apparatus cycle according to claim 4, wherein said centrifuge is provided with means arranged for, successively, moving it axially in a first direction while said sherbet is injected into said centrifuge, then in the opposite direction for pressing the sherbet scraped by the injection head between said head and said plate and wherein said jack is controlled by means synchronized with the axial movement of the centrifuge for withdrawing said plate and opening said centrifuge after said centrifuge had been moved along its return stroke by a predetermined amount.

6. In an apparatus for concentration of water containing food products,
    a freezer tank provided with cooling means and stirrer means for transforming said food products into a sherbet comprising the water contained in said food products, as ice crystals, and liquid and solid products to be retained,
    conveying means for extracting said sherbet from said tank and transferring it into centrifugal separation means while exerting a low pressure only on said sherbet, said centrifugal separation means comprising a perforated drum mounted for rotation and means for rotating said drum,
    means for forcing the sherbet out of the centrifugal separation means after centrifugation thereof, under a pressure sufficient for compacting and agglomerating the ice crystals into pieces of ice and for pressing products to be retained out of said ice,
    and means for collecting the products flowing out of the sherbet in said conveying and forcing out means and the products flowing through said perforated drum,
    said conveying means, centrifugal separation means and forcing out means being constructed to subject the sherbet to compressive stresses of increasing values as it progresses in the apparatus, under conditions avoiding substantial melting of the ice.

7. Apparatus according to claim 6, having means for recycling the compacted ice and using it for the preparation of fresh aqueous food products.

* * * * *